April 26, 1938.  C. M. SMART  2,115,287
AUXILIARY SASH CONSTRUCTION
Original Filed May 8, 1935
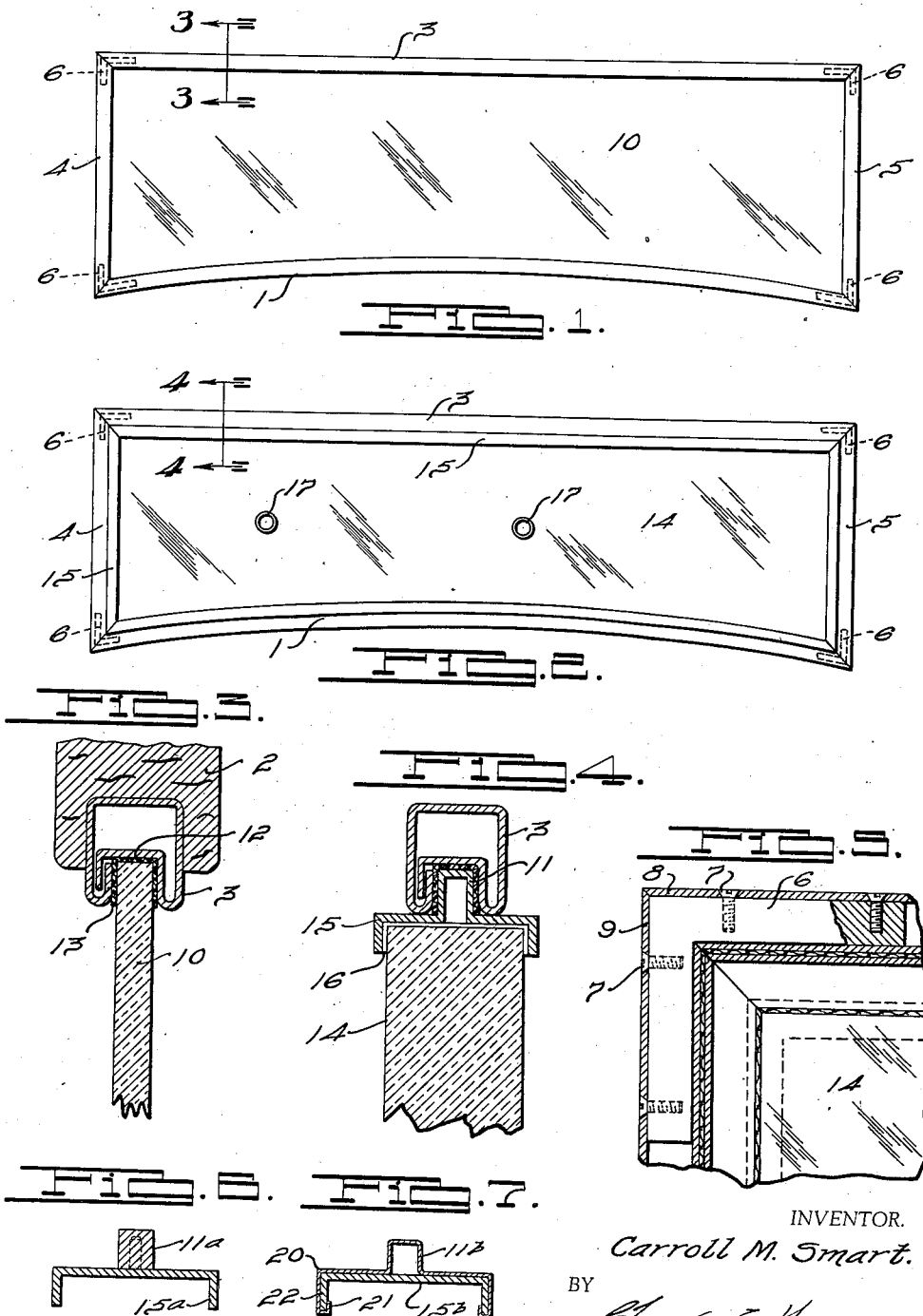
INVENTOR.
Carroll M. Smart.
BY
ATTORNEY.

Patented Apr. 26, 1938

2,115,287

UNITED STATES PATENT OFFICE 2,115,287

AUXILIARY SASH CONSTRUCTION

Carroll M. Smart, Detroit, Mich.

Application May 8, 1935, Serial No. 20,369
Renewed February 10, 1937

11 Claims. (Cl. 189—64)

This invention relates to auxiliary sash for use in conjunction with a primary sash for instance as is used in automobiles.

The particular purpose of the invention is to provide a glassed frame that may be introduced into the primary frame for the usual glass of a window or door element of an automobile body or for other locations wherever it is desired to introduce a particular form of glass of a thickness greater than the glass receiving groove of the primary sash.

The usual automobile glass and glass for instance usual in bank enclosures is inadequate to prevent a bandit from firing through the glass at the driver or other occupant of an automobile or the teller of a bank or office where better protection is required for the attendant than is at present possible.

The description of the invention is largely confined to the automobile sash for the doors or windows but as this description is practically identical in either structure in respect to the changing of the glass of a sash, the applicability of the invention to other uses than with an automobile will be readily apparent.

The ordinary glass of an automobile is about three-eighths of an inch thick and the sash for the automobile has a groove to receive the peripheral edge of the glass and the frame of the automobile to receive the sash, which is usually of sheet metal, is provided with a runway for the sash.

It has heretofore been required to remove the frame and provide a new frame where glass of materially greater thickness is to be used. It is to avoid this removal or reconstruction of the frame and to utilize the original sash fitting therein in which is inserted an auxiliary frame carrying a glass of about one and one-eighth to one and one-half inches in thickness and thus a change may be made from the comparatively thin glass of the usual automobile to the bullet-proof glass of materially greater thickness.

By my auxiliary frame construction, I am able to simply remove the glass from the primary sash of an automobile and insert the auxiliary glassed sash of my invention without changing any other portion of the vehicle body or the frame for the original sash whatever its location may be. This is particularly useful for police cars and the bullet-proof glass is usually provided with gun ports (not forming a particular feature of this invention) through which the occupants of the car may fire upon bandits without fear of themselves being injured through penetration of the glass from the firearms of a bandit.

These objects and other various features of the invention are hereinafter more fully described and claimed, and the preferred form of construction of an auxiliary glassed sash for use in conjunction with a sash for a comparatively thin glass is shown in the accompanying drawing in which—

Fig. 1 shows the ordinary glassed windshield frame in elevation.

Fig. 2 is an elevation of the same frame in which my auxiliary glassed frame has been introduced.

Fig. 3 is a section taken on line 3—3 of Fig. 1 showing the usual form of the primary sash and glass.

Fig. 4 is a section taken on line 4—4 of Fig. 2 showing the same primary sash and my auxiliary glassed sash associated therewith.

Fig. 5 is an enlarged sectional elevation of a corner of both the primary and auxiliary sashes showing the manner in which the primary sash is held united at the corners.

Fig. 6 is a cross section of a modified form of the auxiliary sash.

Fig. 7 is a cross section of another form of the invention.

In Fig. 1, I have shown the usual sash for the glass of an automobile windshield as an instance of the use of the invention in which the lower rail 1 is curved to fit the curve of the lower portion of the frame (not shown) in which it is seated and in Fig. 3 I have shown at 2 a part of the frame in which the primary sash is usually secured. This frame is of the same rectangular form as the primary sash and receives all four rails thereof. This showing in Fig. 2 is merely indicative of such a frame structure. It is pointed out that this frame structure 2 and 3 varies considerably with different automobile body forms and it is therefore intended merely to indicate the frame in which the primary sash is fitted.

The primary sash is formed of the lower rail 1, the upper rail 3 and the end rails 4 and 5 which are mitered at the corners as shown and these frames are of hollow form as is shown in cross section Figs. 3 and 4. At the corners is usually provided in the ordinary automobile frames, an L shaped member 6 which has threaded apertures to receive screws 7 passing through the outer walls 8 and 9 of the meeting rails. This member 6 holds the frame members in position and by removal of the screws 7 on one leg of the L member, as for instance the leg 6 indicated in dotted lines in Fig. 1 at each end of the lower rail 1, this rail may be withdrawn from association with the end rails 4 and 5 and permit removal of the glass 10 therein from the bottom. Thereafter my improved auxiliary sash and glass may be introduced as the auxiliary sash has a rib 11 fitting in the glass groove 12 of the primary sash.

The usual primary rail is shown in section in Fig. 3 and is formed of sheet metal providing a rectangular body fitting the recess provided therefor in the frame 2 and is folded upon itself to provide the sash groove 12 in which the edge of the glass 10 fits and usually a packing element 13 is provided between the glass and the walls of the groove.

It is obvious that the thick bullet-proof glass, indicated at 14 in Fig. 4, cannot be used with the primary sash, firstly because it is of greater width than the sash and thus would require a greater width of the sash and such greater width of the sash cannot be used with an automobile body or in any character of previous installation unless the frame be rebuilt to receive the wider sash. I therefore have devised an auxiliary sash indicated in section at 15 in Fig. 4, which is of channel form in cross section to receive the edge of the thick glass and with which the usual packing element 16 is associated. I so form the outer peripheral face of the auxiliary sash 15 as to provide a rib which may be formed as an integral part of the sheet metal auxiliary sash indicated at 11 in Fig. 4 or may be a bar 11ª secured to the sash 15ª as by means of a screw indicated in dotted lines in Fig. 6. Other shapes may be employed, the essential characteristic being that a channel of sufficient width be provided to receive the thicker bullet-proof glass and a rib for engaging in the glass groove of the primary sash. Usually gun ports 17 are provided in the bullet-proof glass which may be of any desired construction.

In Fig. 7 I have shown another form of auxiliary sash. In this construction the main portion of the sash 15ᵇ is of channel form in cross section and on this channel is mounted a comparatively thin sheet metal member 20 which is also of channel form having the edges of the side walls thereof inturned as at 21 over the edge of the wall 22 of the channel 15ᵇ at each end. This member 20 has a central portion on the exterior face of the channel 15ᵇ forming a rib 11ᵇ functioning in the same manner as the rib 11ª of Fig. 6 or 11 of Fig. 4. This rib engages in the primary sash of the windshield or window of any character of construction that is originally grooved to receive a glass of materially less width than the bullet-proof glass desired to be installed therein. In respect to the width of the bullet-proof glass, this glass in some installations may be as great as two inches in thickness to withstand a bullet from a high powered gun and in such cases of extreme width the rib 11, 11ª or 11ᵇ may be placed nearer one side of the glass receiving channel 15, 15ª or 15ᵇ in which case the center plane of the glass would be offset relative to the center plane of the primary sash to the extent desired. In automobile windshields for instance, the greater projection of the glass would preferably be on the exterior face of the windshield rather than projecting interiorly thereof. In such latter case it might possibly interfere with the arrangement of the frame or parts of the automobile lying adjacent thereto. It is thus to be seen by my improved construction, that glass of any thickness greater than the width of the glass groove of the primary sash is capable of receiving may be readily mounted therein.

It will be evident that the work of removal of the original glass from the primary sash of an automobile is readily accomplished, one rail being first removed, the glass 10 then withdrawn from the glass grooves of the sash and replaced by my bullet-proof glass and auxiliary sash of either form shown having a rib for sliding relation with the glass groove of the primary sash.

The installation may be very readily and inexpensively accomplished and without altering the body structure to receive such greater thickness of glass as is required in the formation of a bullet-proof automobile body. It is to be understood of course that with such bodies the interior of the body with the exception of the glass is provided with an armor plate or other means for prevention of penetration of the bullet fired from the exterior of the vehicle. Such bullet-proofing of an automobile body is commonly known and the weak feature of such previous construction lies in the fact of the expensiveness of the installation of the bullet-proof glass which by my invention is reduced to a minimum.

Obviously, the invention is applicable to various characters of installation, as for instance in bank counter enclosures, and by utilizing the invention herein described a portion of the primary sash of the original glass may be removed, the glass removed from the remainder of the sash and my glassed sash having a form indicated generally in Figs. 4 and 6 may be introduced thereinto without necessity of reconstructing the original framework of the bank enclosure. In an automobile windshield and other glassed frames where the glass is not slidable as in bank enclosures for instance, the main frame 2, the original glass receiving sash 3 and the auxiliary sash having the peripheral outer rib and wide glass receiving inner edge are mounted together in a non-slidable relationship with each of the frames enclosed by the next outer frame.

The various objects of the invention are believed to be attained by the construction described, and it will be evident that the invention materially reduces the cost of a change from a thin to a thick bullet-proof glass and is readily accomplished with a minimum amount of labor.

Having thus briefly described my invention, its utility and mode of operation, what I claim and desire to secure by Letters Patent of the United States is—

1. The combination with a primary sash having a peripheral glass receiving groove in its inner face, of means for mounting a glass of greater thickness than the width of the groove in the said primary sash, comprising an auxiliary sash having a peripheral glass receiving groove in its inner face for receiving the glass of greater thickness, and a peripheral rib on the exterior of the auxiliary sash of the same width as and fitting in the glass receiving groove of the primary sash.

2. The combination with a primary sash having a peripheral glass receiving groove in its inner edge, of means for mounting a glass of greater thickness than the width of the groove in the said sash, comprising an auxiliary sash of channel like form in cross section, the channel being of a width to receive a glass of greater thickness than the groove of the primary sash, the auxiliary sash being formed to provide a peripheral rib on its exterior surface of a form to engage in the glass receiving groove of the primary sash.

3. The combination with a primary sash having a peripheral glass receiving groove in its inner edge, of means for mounting a glass of greater thickness than the width of the groove in the said sash, comprising an auxiliary sash of sheet metal of channel like form in cross section and providing a groove in its inner peripheral edge of a width to receive the glass of greater width, and a rib on the outer peripheral edge of the said auxiliary sash of a width to engage in the glass groove of the primary sash.

4. The combination with a primary sash having a peripheral glass receiving groove in its inner edge, of means for mounting a glass of greater thickness than the width of the groove in the said primary sash, comprising an auxiliary sash having a peripheral glass receiving groove in its inner edge of a width to receive the glass of greater thickness, and a peripheral rib on the exterior of the auxiliary sash positioned in a center plane of the glass receiving groove and fitting in the glass receiving groove of the primary sash.

5. The combination with a primary sash having a peripheral glass receiving groove in its inner edge, of means for mounting a glass of greater thickness than the width of the groove in the said main sash, comprising an auxiliary sash having in its inner peripheral edge a glass receiving groove of a width to receive the glass of greater thickness, and a peripheral rib secured to the outer edge of the auxiliary sash and fitting the glass receiving groove of the main frame.

6. The combination with a main sash having a peripheral glass receiving groove in its inner edge, means for mounting a glass therein greater in thickness than the width of the groove in the said main sash, comprising an auxiliary sash having a frame of channel form in cross section, the open side of which forms the peripheral groove to receive the glass of greater thickness, a second channel like frame of sheet metal secured on the exterior face of the said first channel and formed between the edges thereof to provide a peripheral rib for engagement in the peripheral groove of the main sash.

7. The combination with a main sash having a peripheral glass receiving groove in its inner edge, means for mounting a glass therein of greater thickness than the width of the groove, comprising an auxiliary sash having a frame of channel form, the spaced side walls of which provide a groove to receive the glass of greater thickness, a second element of channel like form of comparatively thin sheet metal, the side walls of which are greater in length than and engage over the side walls of the first named channel, the edges of the walls of the second channel being inturned over the edge of the first channel whereby the second channel element is secured to the first channel element, said second channel element having its body between the side walls shaped to provide a hollow rib for engaging in the sash groove of the main sash.

8. The combination with a main sash of rectangular form having a peripheral glass receiving groove in its inner edge, said main sash having a removable rail, of means for mounting a glass of greater thickness than the width of the groove in the said main sash, comprising a substantially rectangular auxiliary sash having in the inner edge a peripheral glass receiving groove of a width to receive a glass of greater thickness than the width of the groove in the main sash, and a peripheral rib on the exterior of the auxiliary sash of a width to slidably engage in the grooves of the main frame whereby, on removal of the removable rail of the main sash, the auxiliary sash and glass therein may be introduced into the grooves of the remaining rails of the main sash to position therein permitting replacement of the detachable rail in a required position.

9. The combination with a main frame of substantially rectangular form having a peripheral groove in its inner edges, a sash element for mounting in the groove having a peripheral glass receiving groove in its inner edges, and means for mounting therein glass of greater thickness than the width of the groove in the said sash element, comprising an auxiliary sash having an exterior peripheral rib for fitting in the glass receiving groove of the sash element and having inner flanges spaced apart a distance greater than the width of the said sash element to receive a glass of materially greater thickness than the width of the groove in the said sash element, said auxiliary sash having a removable rail permitting introduction of the glass into the grooves thereof.

10. A mounting for an auxiliary glass supporting sash in a primary frame having a groove in its inner face, comprising a sash element formed of sheet metal bent upon itself to form a rectangular structure having a peripheral groove in its inner face formed by return bent interlocking edge portions spaced to form a glass receiving groove in its inner face, an auxiliary sash comprising a substantially rectangular frame element having inwardly projecting side flanges spaced apart a distance to receive a glass of greater thickness than the width of the groove of the first named sash element, a peripheral projection on the outer face of the auxiliary sash fitting the groove formed in the first named sash element, and a packing element between said projection of the glass and the first element, the base of the auxiliary sash lying in engagement with the inner edges of the flanges of the sash.

11. A mounting for an auxiliary glass supporting sash in a primary frame having a peripheral groove in its inner face, comprising a sheet metal frame element formed at its inner edge to provide a peripheral glass receiving groove of narrow width, the body of the said sheet metal frame element being of a width to seat in the groove of the primary frame, an auxiliary sash, a peripheral rib on the outer face for engagement in the glass receiving groove of the sheet metal frame element and having side flanges spaced apart a distance greater than the width of the glass receiving groove of the sheet metal frame, said auxiliary sash having one of its rails removable to permit introduction of the glass element in the remaining portions thereof, and means for securing the removable rail in place, said primary frame, sheet metal frame, and auxiliary sash being fitted together in non-slidable relationship.

CARROLL M. SMART.